(12) United States Patent
Dunbar

(10) Patent No.: US 8,746,377 B1
(45) Date of Patent: Jun. 10, 2014

(54) ELECTRIC UTILITY CART

(75) Inventor: Chris T. Dunbar, Greensboro, NC (US)

(73) Assignee: Blue Comet Ventures, LLC, High Point, NC (US)

( * ) Notice: Subject to any disclaimer, the term of this patent is extended or adjusted under 35 U.S.C. 154(b) by 351 days.

(21) Appl. No.: 13/110,969

(22) Filed: May 19, 2011

(51) Int. Cl.
*B62D 51/04* (2006.01)

(52) U.S. Cl.
USPC ......... 180/19.2; 180/65.1; 180/211; 224/519; 296/3; 280/30; 280/79.11

(58) Field of Classification Search
USPC ............ 180/65.6, 65.1, 19.2, 211; 280/87.01, 280/79.11, 79.2, 79.3, 62, 35, 651, DIG. 11, 280/30; 296/3, 32, 34, 36; 224/537, 529, 224/519
See application file for complete search history.

(56) References Cited

U.S. PATENT DOCUMENTS

| | | | | |
|---|---|---|---|---|
| 1,596,795 | A | * | 8/1926 | Blakeney ...................... 280/748 |
| 2,993,727 | A | * | 7/1961 | Zewiske ........................... 296/13 |
| 4,423,899 | A | * | 1/1984 | Langmead .......................... 296/3 |
| 4,593,840 | A | * | 6/1986 | Chown ........................... 224/520 |
| 5,028,060 | A | * | 7/1991 | Martin ............................. 280/39 |
| 6,168,058 | B1 | * | 1/2001 | Janek ............................ 224/527 |
| 6,202,909 | B1 | * | 3/2001 | Belinky et al. ................ 224/524 |
| 6,308,792 | B1 | * | 10/2001 | Garrett ........................ 180/19.3 |
| 6,523,776 | B1 | * | 2/2003 | Elder .......................... 242/594.4 |
| 6,550,791 | B2 | * | 4/2003 | Ramsey ...................... 280/47.19 |
| 7,055,642 | B1 | * | 6/2006 | Chambers et al. ............. 180/312 |
| 7,210,545 | B1 | * | 5/2007 | Waid ............................ 180/65.1 |
| 7,380,803 | B2 | * | 6/2008 | Thomas ................... 280/33.992 |
| 7,441,783 | B2 | * | 10/2008 | Clark et al. ..................... 280/35 |
| 7,641,235 | B1 | * | 1/2010 | Anduss ......................... 280/769 |
| 7,762,363 | B1 | * | 7/2010 | Hirschfeld ................... 180/65.1 |
| 7,905,508 | B2 | * | 3/2011 | Crawford et al. .......... 280/490.1 |
| 7,963,530 | B1 | * | 6/2011 | Garcia ............................ 280/30 |
| 8,167,061 | B2 | * | 5/2012 | Scheuerman et al. ........ 180/65.1 |
| D661,451 | S | * | 6/2012 | Armstrong et al. ............ D34/17 |
| 8,286,739 | B2 | * | 10/2012 | Oliphant ...................... 180/65.1 |
| 2006/0048534 | A1 | * | 3/2006 | Beal ................................ 62/239 |
| 2006/0118586 | A1 | * | 6/2006 | Heravi .......................... 224/519 |
| 2006/0208440 | A1 | * | 9/2006 | Clark et al. ................ 280/47.35 |
| 2008/0197608 | A1 | * | 8/2008 | Dixon .......................... 280/654 |
| 2010/0059950 | A1 | * | 3/2010 | Coghill, Jr. ................ 280/47.26 |
| 2010/0123294 | A1 | * | 5/2010 | Ellington et al. ........ 280/47.371 |
| 2012/0255798 | A1 | * | 10/2012 | Palmer ........................ 180/65.6 |
| 2013/0229025 | A1 | * | 9/2013 | Johnasen, Abram ............. 296/3 |

* cited by examiner

*Primary Examiner* — Katy M Ebner
*Assistant Examiner* — Emma K Frick
(74) *Attorney, Agent, or Firm* — Blake P Hurt

(57) ABSTRACT

An electric utility cart to assist in transportation and hauling various items is disclosed. The utility cart includes a handle with a throttle to control the speed of the cart during use. A single 360° rotatable front wheel in combination with a pair of wide rear wheels which are joined to a differential allows the cart to turn in tight circles. A directional switch proximate the handle allows the user to drive the cart in either a forward or rearward direction. An auxiliary rack can be mounted on the cart as needed for carrying surf boards or other large items. A hitch rod allows the cart to be suspended and transported by a conventional vehicle such as a car, SUV or pickup truck having a typical tubular hitch.

19 Claims, 9 Drawing Sheets

ELECTRIC UTILITY CART

FIELD OF THE INVENTION

The invention herein pertains to a utility cart and particularly pertains to a utility cart which is motorized and hand directed. The cart has many advantages over other carts used on sandy soils and uneven terrains due to its wide tires and short turning radius.

DESCRIPTION OF THE PRIOR ART AND OBJECTIVES OF THE INVENTION

In recent years increasing numbers of consumers have realized the advantages of using electric or motorized carts to assist in various tasks. Such tasks may be for example transporting fishing gear from a vehicle to a desired site on a dock or beach. Other tasks may include transporting of lawn tools, supplies and equipment. Certain other tasks involve moving items to or from a store room or general storage area. Hunters and other outdoors men often utilize utility carts for carrying game or supplies, such as shown in U.S. Publication No. 2008/0197608.

Certain carts made in the past have limited utility and are difficult to operate and turn in sandy soils and on uneven terrains. Other known carts are subject to long turning radiuses and are difficult to maneuver in confined spaces such as inside a warehouse or on a crowded beach. Other prior carts have relatively small load capacities and are expensive to manufacture and purchase.

Thus with the problems, disadvantages and inefficiencies of current utility carts, the present invention was conceived and one of its objectives is to provide a hand directed utility cart in which the user walks in front or behind, easily directing the cart for the task at hand.

It is another objective of the present invention to provide an electric motorized utility cart which is inexpensive to manufacture and purchase, yet is simple to operate with a hand throttle and directional switch without extensive training or practice.

It is still another objective of the present invention to provide a utility cart which can be easily steered and turned in confined spaces utilizing a front wheel which freely pivots three hundred sixty degrees (360°) and includes a differential on the rear axle which allows independent rotation of each rear wheel.

It is yet another objective of the present invention to provide a utility cart with relatively large, wide tires and a hand throttle for efficient maneuvering over sand and uneven terrains.

It is a further objective of the present invention to provide a utility cart which includes an auxiliary rack for carrying surf boards or similar equipment.

It is still a further objective of the present invention to provide a utility cart having a series of cylindrical holders for transporting fishing poles or the like.

It is yet a further objective of the present invention to provide an electric utility cart which can be quickly loaded and coupled to a hitch bar for transportation of the cart behind a standard vehicle while the cart is suspended above the road.

Various other objectives and advantages of the present invention will become apparent to those skilled in the art as a more detailed description is set forth below.

SUMMARY OF THE INVENTION

The aforesaid and other objectives are realized by providing an electric utility cart which includes a frame formed from tubular aluminum. A tubular aluminum railing attached to and positioned above the frame provides depth and a large load capacity. Cylindrical holders are joined to the frame and rail which are beneficial for the transportation of fishing equipment such as fishing rods that are placed in the holders and held in a secure, stable fashion. A tongue is releasably attached to the front end of the cart which is held in a sheath joined to the frame. The tongue is L-shaped and along its proximal end a handle is normally affixed. The handle includes a rotatable throttle for adjusting the electric motor by increasing or decreasing the cart speed. A bi-directional switch affixed to the tongue proximate the handle allows the user to drive the cart in either a forward or rearward direction. An auxiliary rack formed from tubular aluminum can be temporarily joined to the cart frame and held in place using a series of clevises and pins which is of particular use while transporting surf boards or other long, heavy items.

To transport the cart on trips or over long distances, a hitch rod is provided having a head which includes a pair of frame grippers. The hitch rod can be quickly inserted into a standard tubular vehicle hitch for suspending the utility cart thereon and for securing the cart frame to the hitch bar.

DETAILED DESCRIPTION OF THE PREFERRED EMBODIMENT AND OPERATION OF THE INVENTION

Figure 1:
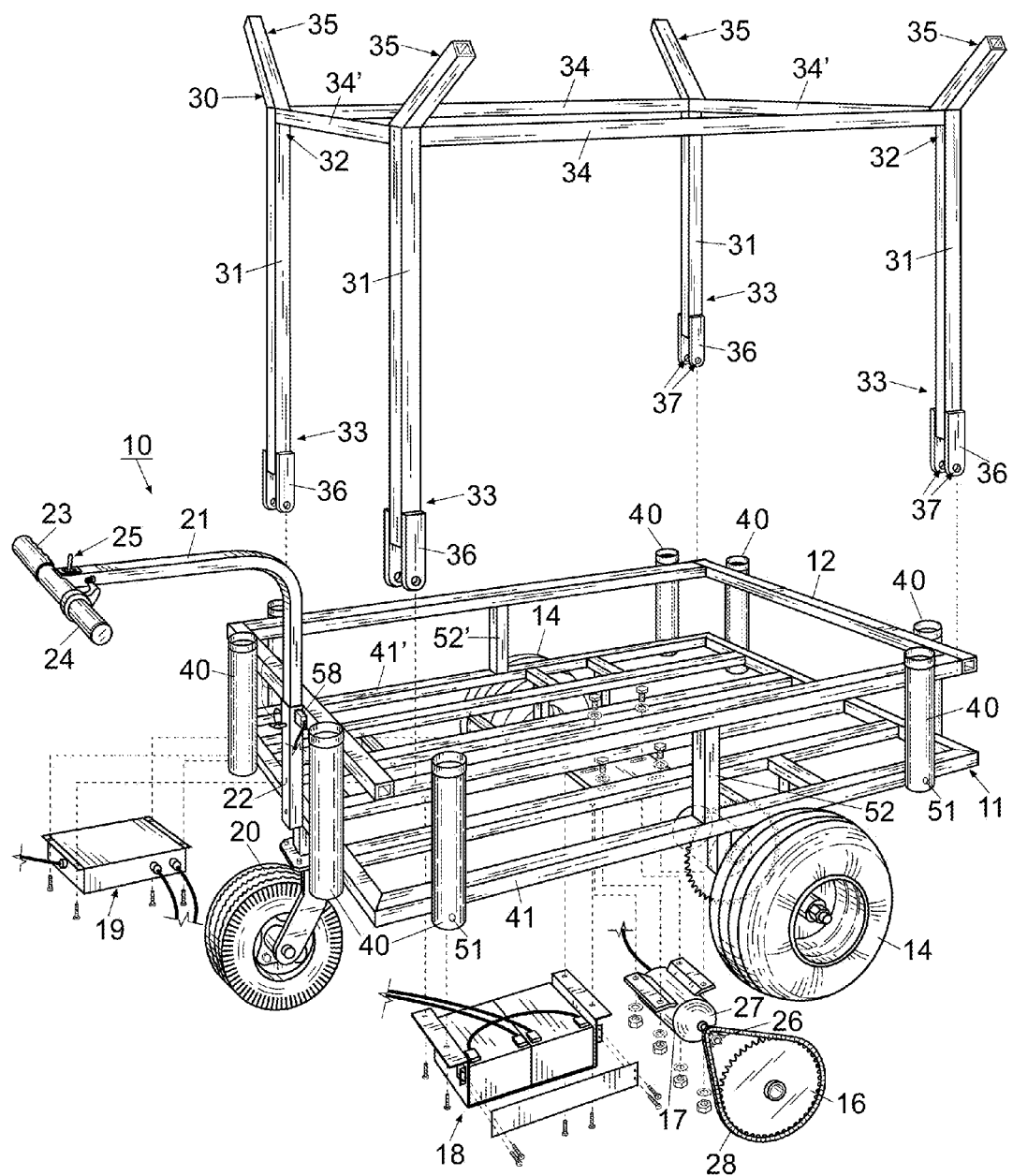
FIG. 1 shows a partial exploded perspective view of the utility cart of the invention with an auxiliary rack.
Figure 2:
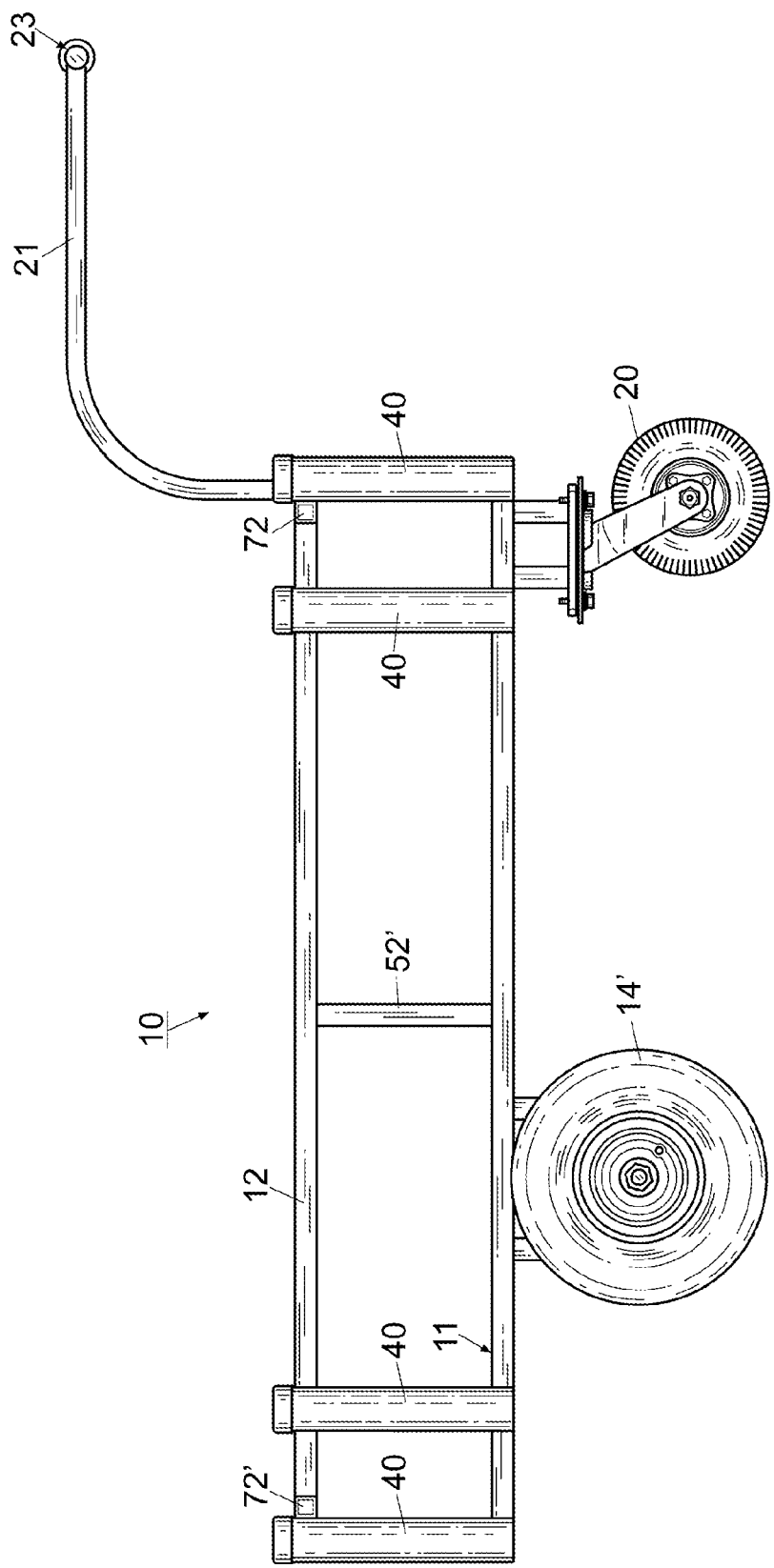
FIG. 2 demonstrates a left side elevational view of the cart as seen in FIG. 1 without certain of the electrical components, the right side elevational view being a mirror image thereof.
Figure 3:
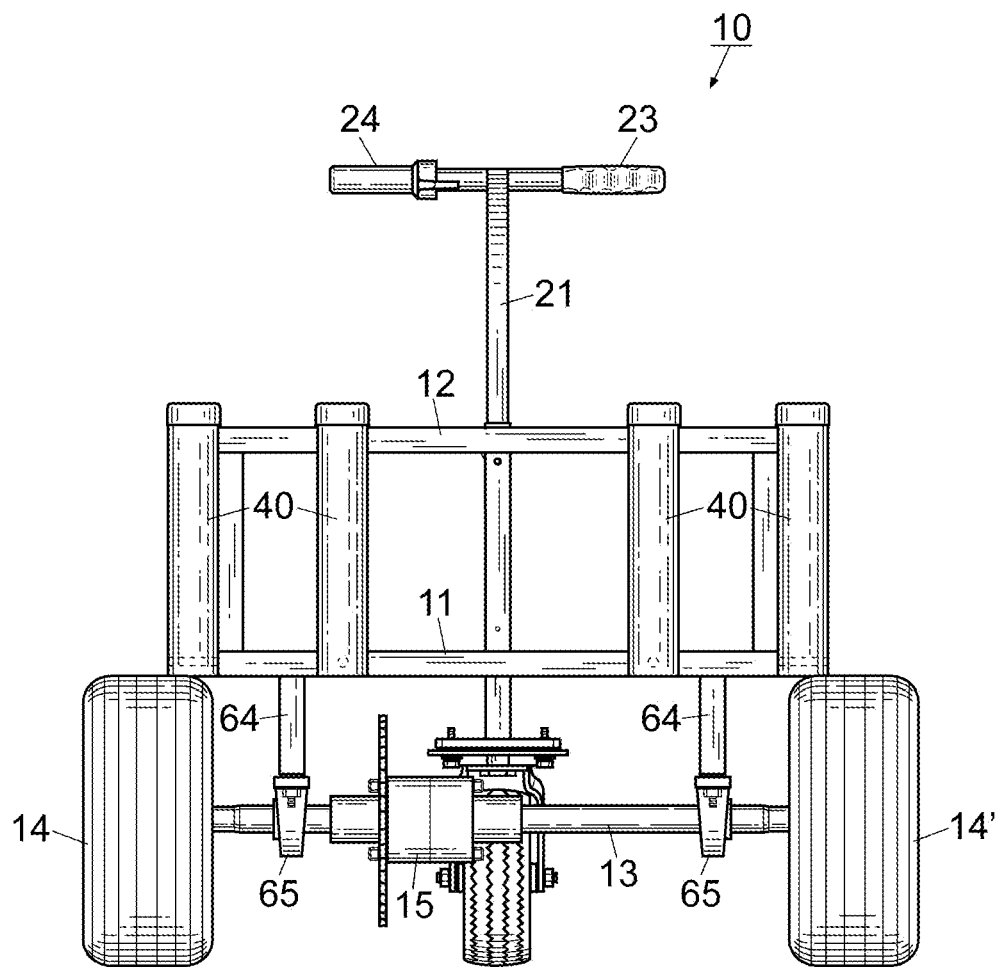
FIG. 3 illustrates a rear elevational view of the cart as seen in FIG. 2.
Figure 5:
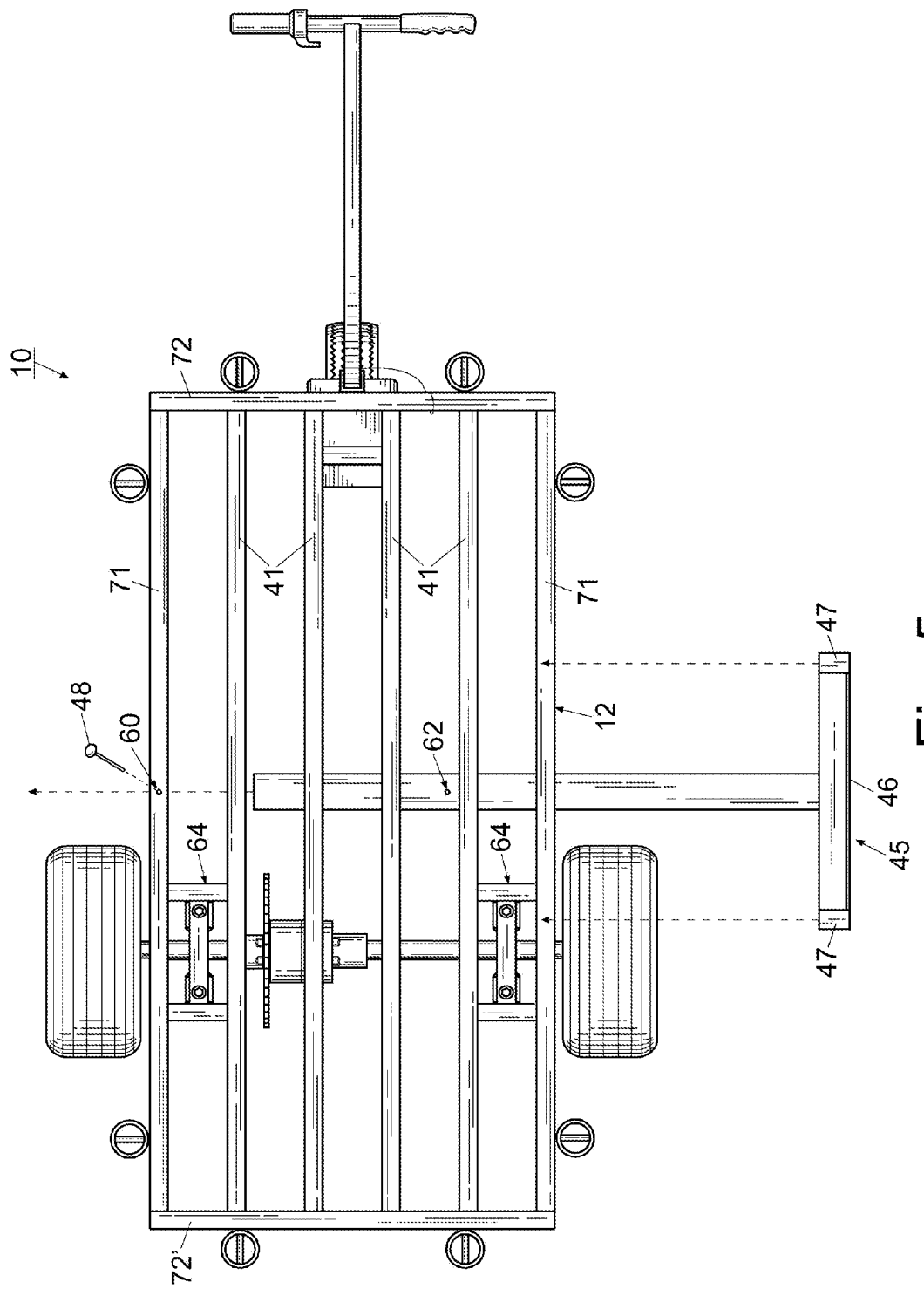
FIG. 5 pictures a top plan view of the utility cart seen in FIG. 2 with an unattached hitch bar.
Figure 6:
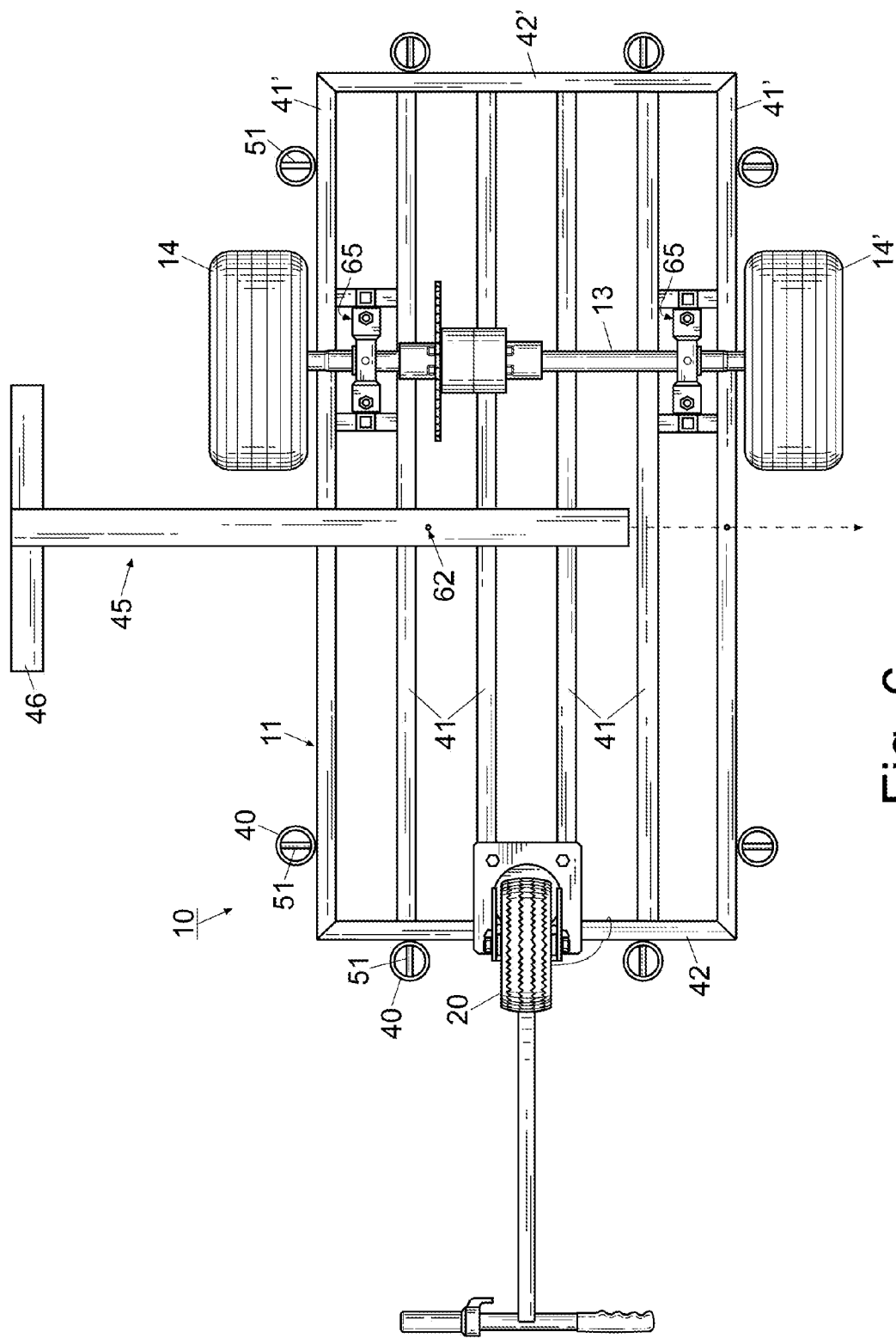
FIG. 6 features a bottom plan view of the utility cart and hitch bar as shown in FIG. 5.

For a better understanding of the invention and its operation, turning now to the drawings, FIG. 1 shows preferred electric utility cart 10 in a partially exploded view with auxiliary rack 30 as seen in perspective fashion. Utility cart 10 includes a planar rectangular frame 11 and an upper rectangular retaining rail 12. Frame 11 utilizes a series of one inch square aluminum tubular members which are welded together. Retaining rail 12 has the same outer dimensions as frame 11 and is also formed from one inch square aluminum tubular members. Planar rectangular frame 11 as seen in FIG. 6 includes a pair of opposing transverse members 42 (front), 42' (rear), a pair of opposing outer longitudinal members 41' and a series of four inner longitudinal members 41. Longitudinal members 41, 41' are each welded at different ends to transverse members 42, 42' to form frame 11. Retaining rail 12 as seen in FIG. 5 includes a pair of opposing longitudinal members 71 which are welded at each end to a pair of opposing transverse members 72 (front), 72' (rear). Opposing vertical retaining rail supports 52, 52' are also shown in FIG. 1 and are welded to retaining rail 12 and frame 11. Rail supports 52, 52' as seen in FIG. 2 are centrally located between transverse members 42, 42' of frame 11 and transverse members 72, 72' of retaining rail 12. A series of cylindrical holders 40 are welded to the sides of frame 11 and retaining rail 12 to maintain fishing rods, beach umbrellas or other similar sized items for transportation purposes. Eight cylindrical holders 40 are shown in FIG. 1 although more or less may be attached to utility cart 10 as desired. Cylindrical holders 40 are preferably positioned two on each side in close proximity to the corners of frame 11 and retaining rail 12 to provide structural integrity to cart 10.

Figure 7:
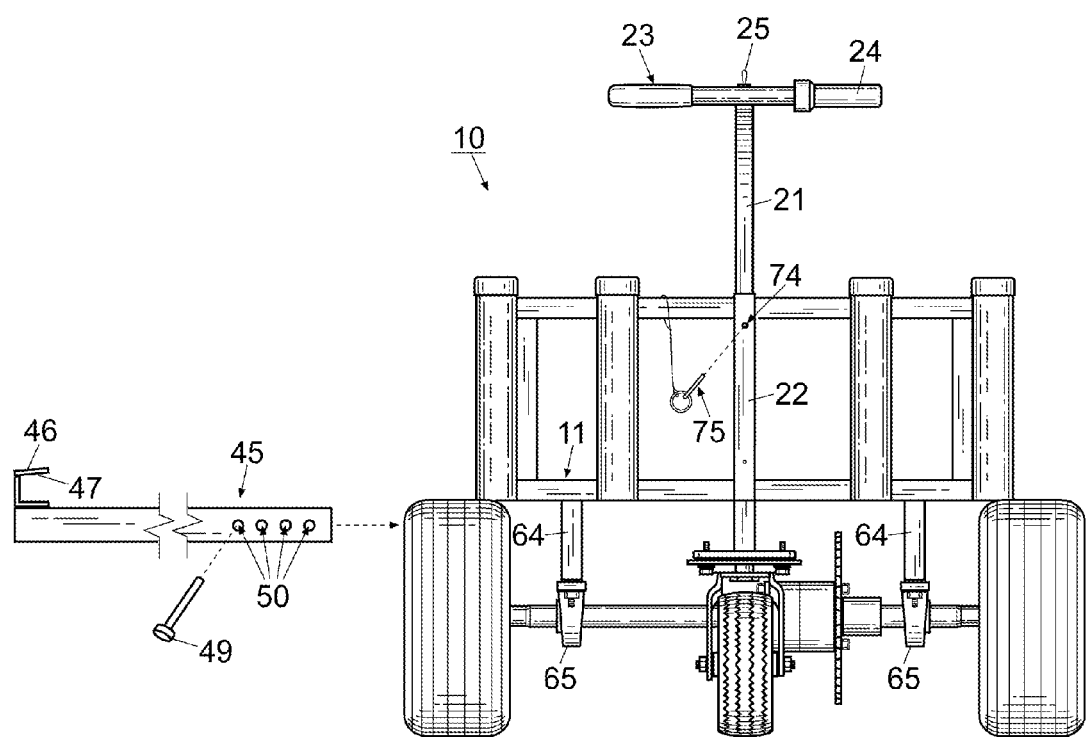
FIG. 7 shows a front elevational view of the utility cart as seen in FIG. 2 with the unattached hitch bar in an abbreviated manner.
Figure 8:
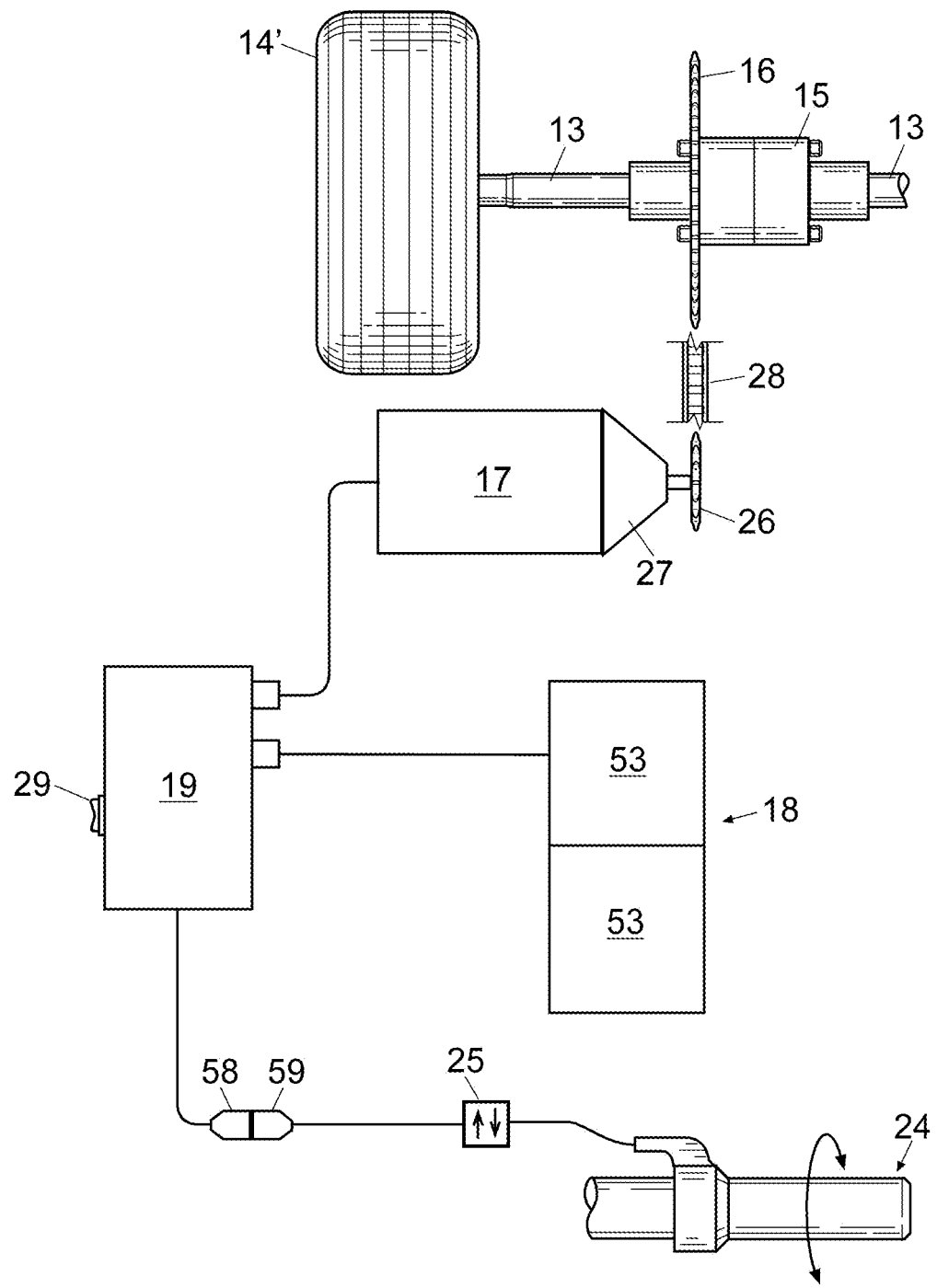
FIG. 8 demonstrates a general schematic of the electrical circuitry of the utility cart shown in FIG. 1.
Figure 9:
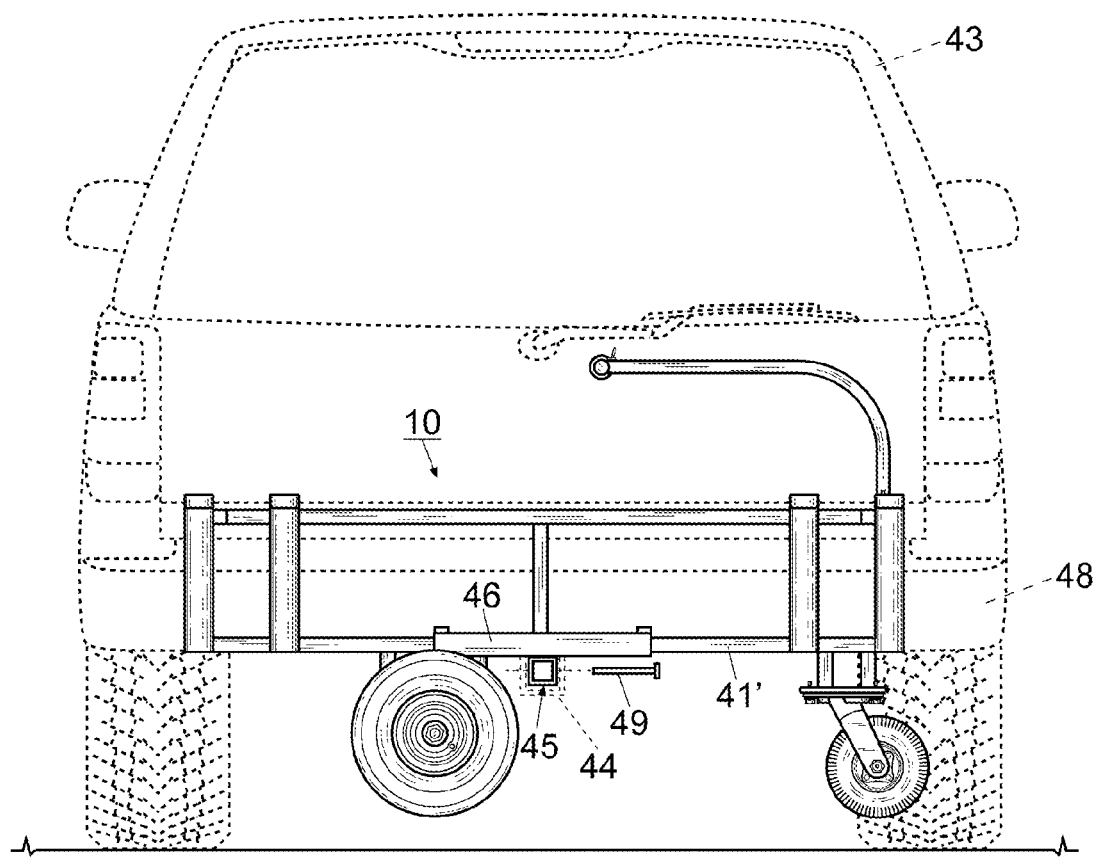
FIG. 9 depicts the utility cart positioned on the hitch bar and connected to a hitch of a vehicle.

Utility cart 10 as seen in FIGS. 1-9 also includes stationary or non-pivotal tongue 21 having handle 23, throttle 24 and bi-directional switch 25 for steering and operation. Tongue 21 is slidably received within tongue sheath 22 which is rigidly joined to frame 11 and rail 12 such as by welding for increased structural integrity. Tongue 21 does not rotate when in sheath 22 which is rigidly affixed to frame 11. Tubular sheath 22 includes sheath aperture 74 for joining tongue 21 thereto by pin 75 (FIG. 7). Once tongue 21 is slideably positioned within sheath 22, pin 75 is placed within aperture 74 of sheath 22 and an aperture (not shown) in tongue 21 to "lock in" and prevent removal of tongue 21. Tongue 21 as seen in FIG. 6 extends outwardly during use of cart 10 and can be reversed as seen in FIG. 9 for transport or storage. For removal pin 75 is pulled therefrom, and by disconnecting connectors 58, 59 tongue 21 can be lifted and removed from sheath 22, reversed and repositioned within sheath 22 whereby pin 75 can be replaced and connectors 58, 59 reconnected if power is needed. Pin 75 having a finger ring is attached to retaining rail 12 by a thin wire or cord as seen in FIGS. 1 and 7 to prevent loss. For clarity purposes, in FIGS. 2-7 cart 10 is generally seen without the electrical components.

Utility cart 10 includes a pair of wide rear wheels 14, 14' and a somewhat narrower, pivotable front wheel 20 as seen in FIG. 6. Rear wheels 14, 14' are approximately four inches wide whereas front wheel 20 is approximately two inches wide or about half the width of each of the rear tiers 14, 14'. Front wheel 20 is affixed such as by bolts (not shown) to the bottom of frame 11 and is pivotable three hundred and sixty degrees (360°) for easy hand turning and manipulation of cart 10 in congested areas. Rear wheels 14, 14' are affixed to cart 10 by rear axle 13 which includes axle sprocket 16 and differential 15. Rear axle 13 is attached to frame 11 by U-shaped brackets 64 (FIG. 5) formed form one inch aluminum tubing. Pillow blocks 65 are bolted to U-shaped brackets 64 as shown in FIGS. 3, 5, 6 and 7. Rear axle 13 is mounted in pillow blocks 65. Front wheel 20 and differential 15 act together to allow a very short turning radius of cart 10. Axle sprocket 16 is joined to drive motor sprocket 26 by endless chain 28 which is driven by electric motor 17 shown schematically in FIG. 8. Motor 17 which is a standard 24v, 500 w DC motor is joined to controller 19 which includes on/off switch 29 and utilizes power source 18. Controller 19 is connected to quick electrical connector 58 which is joined by electrical connector 59 first to bi-directional switch 25 and then to throttle 24. As would be understood before removing tongue 21 from sheath 22, electrical connectors 58, 59 should be disengaged to prevent damage to the wiring and electrical components.

Handle 23 is rigidly affixed to L-shaped tongue 21 which is releasably attached to frame 11, by inserting tongue 21 into tongue sheath 22 as also seen in FIG. 7. Tongue sheath 22 is formed from a square aluminum tube sized to slideably accept tongue 21. Tongue 21 can be removed quickly for storage purposes and includes standard male quick disconnect electrical connector 58 and female connector 59 (see FIGS. 1 and 8) for connecting throttle 24 and bi-directional switch 25 to controller 19. Throttle 24 is a conventional hand throttle as used on motorbikes, ATV's, and the like and the speed of cart 10 can be increased by rotating throttle 24 in a clockwise direction as shown in FIG. 1. Throttle 24 is sold by TNC Scooters of Jackson, Tenn. and is spring loaded which, when released returns to its original off position. Throttle 24 as also shown in FIG. 8 in schematic representation is electrically connected to preferred controller 19. Controller 19 is commercially available as model No. YK48-2 as sold by TNC Scooters of Jackson, Tenn. and also includes a three prong male plug (not shown) for providing power to for example a radio or other electrical device (not shown). Power source 18 consists of two (2) standard 12 volt batteries 53 although other power sources or battery sizes could be used, depending on controller 19 and the requirements of electric motor 17. Electric motor 17 powered through controller 19 is preferably a DC brush motor such as "DC Motor 1020" as sold by Shenzhen Unite Industries, Co. of China. Electric motor 17 is joined to standard motor transmission 27 for driving motor sprocket 26.

In operation, a user (not shown) grasps handle 23 which includes throttle 24 and bi-directional switch 25 and turns on/off switch 29 of controller 19 to the "on" position. Power from batteries 53 of power source 18 is sent to throttle 24, bi-directional switch 25 and motor 17. Cart 10 can then be easily steered and moved as needed (see FIGS. 1 and 8). The user can set bi-directional switch 25 to the forward position and manually rotate throttle 24 clockwise to engage motor 17 and transmission 27 which turns motor sprocket 26 and endless chain 28 to likewise rotate axle sprocket 16 on differential 15 of axle 13 to thereby move cart 10 forward. The amount of rotation of throttle 24 controls the speed of cart 10. Slight rotation would induce a slow speed whereby greater rotation would induce faster speeds. If the user wants to reverse the direction of cart 10, throttle 24 is released thereby ending the forward movement and bi-directional switch 25 is pushed to the rearward position. The user can then rotate throttle 24 to engage the drive and direct cart 10 to move rearwardly.

Shown schematically in FIG. 1, electric motor 17, power source 18 and controller 19 are all bolted to the bottom of frame 11 by machine bolts as seen in FIG. 1. Motor sprocket 26 runs endless chain 28 which drives axle sprocket 16. As shown in FIG. 8, axle sprocket 16 is generally affixed to rear axle 13 and differential 15. Differential 15 is standard and is preferably a "100 Series Differential" as sold by Peerless Gear of Salem, Ind. Differential 15 allows rear wheels 14, 14' to turn independently, (one wheel turns while the other is stationary) providing a very short (0°) turning radius for cart 10 as utilized with the three hundred sixty degree (360°) pivoting ability of front wheel 20.

Figure 4:
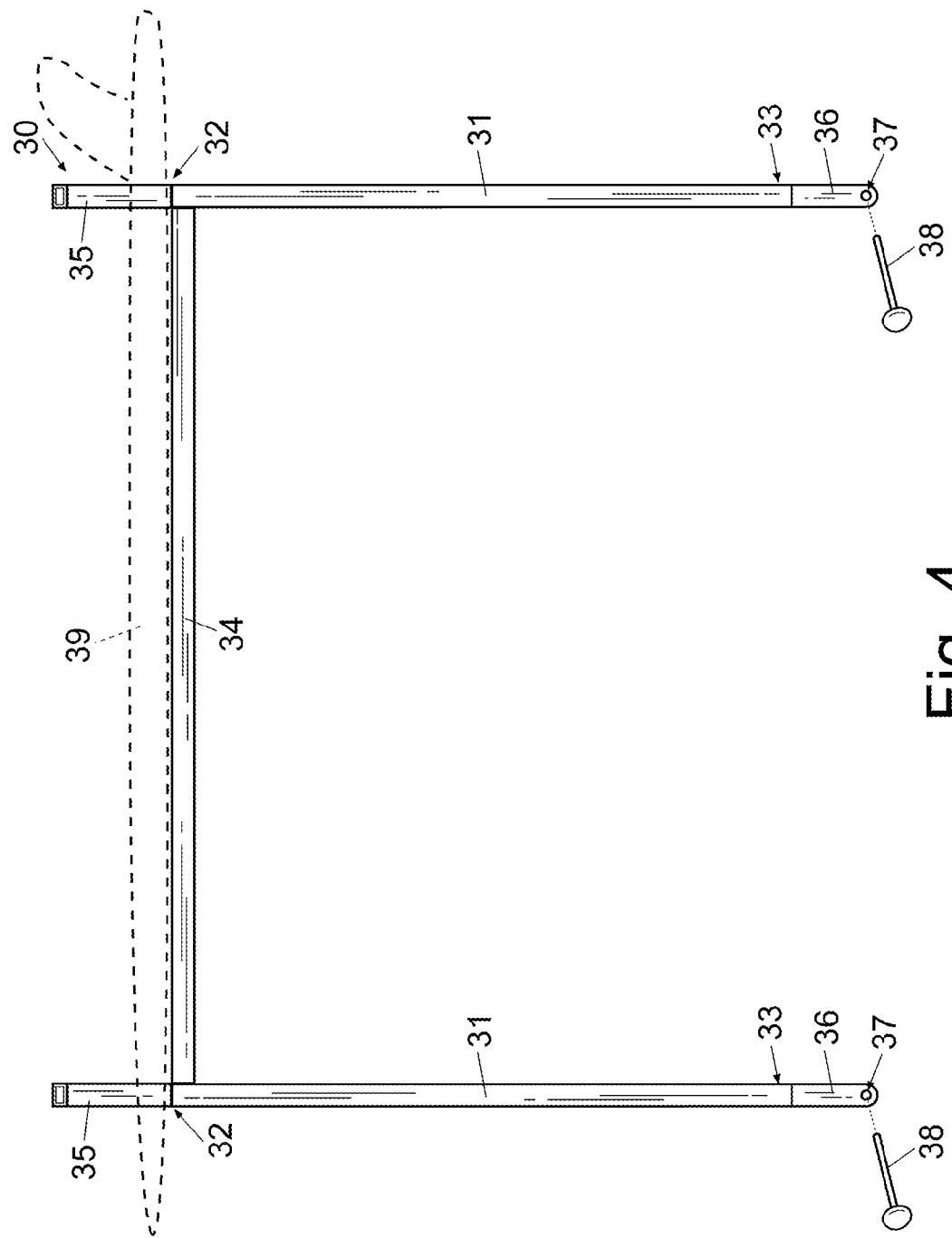
FIG. 4 depicts a right side elevational view of the rack shown in FIG. 1 carrying a surf board shown in ghost fashion.

Auxiliary rack 30 as shown in FIGS. 1 and 4 is releasably affixed to utility cart 10 as needed by the use of four clevis pins 38 (only two shown in FIG. 4). Rack 30 includes a pair of opposing longitudinal members 34, a pair of opposing transverse members 34', and four legs 31 having an upper or proximal end 32 and a lower or distal end 33. Longitudinal members 34 and transverse members 34' are also formed from one inch square aluminum tubular members and are welded together with legs 31 to form a rectangle having the same dimensions as frame 11 and retaining rail 12. Clevises 36 are affixed to each of distal ends 33 as shown in FIGS. 1 and 4 and are sized to snugly straddle and fit over longitudinal members 71 of rail 12 as indicated in FIG. 1. Once so positioned, clevis pins 38 are positioned through apertures 37 (FIG. 4) of clevises 36 and pass beneath retaining rail 12 for secure engagement of rack 30 with cart 10. Rack 30 increases the load size of cart 10 and is useful for hauling elongated items such as surf boards (39), canoes or the like (see FIG. 4) and angled supports 35 help retain surf board 39 (shown in ghost fashion in FIG. 4) in place. Supports 35 are affixed to proximal ends 32 of legs 31 and are angled outwardly about forty-five degrees (45°) as seen in FIG. 1 to help center heavy, elongated items during cart operation.

For easy suspending and hauling of utility cart 10 a typical vehicle and hitch can be utilized. As shown in FIGS. 5, 6, 7 and 9, a vehicle such as SUV 43 (FIG. 9) allows utility cart 10 to be suspended above the road or ground approximately twelve to eighteen inches (12-18") at rear bumper 48 by using hitch bar 45. Hitch bar 45 slides into typical vehicle hitch 44 and is held in place by hitch pin 49 positioned in one of a selected series of openings 50 (FIG. 7) along hitch bar 45 which allow for adjustment and proper securement of utility cart 10. Hitch bar 45 includes T-head 46 as seen in FIGS. 5, 6, 7 and 9. T-head 46 is formed and sized to engage either of longitudinal planar members 41' as shown in FIG. 5. T-head 46 includes a pair of grippers 47 (FIGS. 5 and 7) which are somewhat C-shaped and frictionally engage either of longitudinal members 41' of frame 11. Once cart 10 is in position atop hitch bar 45 pin 48 (FIG. 5) is positioned through aperture 60 in longitudinal frame member 41' as seen in FIGS. 5 and 6 and through one of a variety of apertures 62 in hitch bar 45 to assist in tightly securing hitch bar 45 to utility cart 10. As seen, tongue 21 has been turned to face inwardly. Although not shown as would be understood rack 30 could be affixed to cart 10 as described above when transporting behind a vehicle. Upon arrival at a destination, bar pin 48 is removed to disengage cart 10 from hitch bar 45 and hitch pin 49 is removed to disengage hitch bar 45 from vehicle hitch 44. Cart 10 is then removed and tongue 21 is reversed and locked in place by tongue pin 75 whereby quick electrical connectors 58, 59 are joined. Cart 10 with or without rack 30 affixed thereto can then be loaded such as with beach chairs, fishing gear, cooler, or the like (not shown) while fishing rods, a beach umbrella or the like (not shown) can be positioned in cylindrical holders 40. Holders 40 each include a cylindrical stop 51 as seen in FIGS. 1 and 6. A fishing rod (not seen) will rest on stop 51 while positioned in holder 40. On/off switch 29 is then turned on whereby the user (not shown) can manually flip bi-directional switch 25 for either forward or backward movement and manually rotate throttle 24 to move loaded cart 10 to a designation such as a beach or fishing pier for unloading. Cart 10 provides an easy way to haul a large amount of items in a convenient easy manner on various terrains and in tight or confined spaces.

The illustrations and examples provided herein are for explanatory purposes and are not intended to limit the scope of the appended claims.

I claim:

1. A utility cart comprising: a frame, a hitch bar, said hitch bar for connection to a vehicle hitch, said hitch bar comprising a T-head, said T-head comprises a pair of grippers, said pair of grippers spaced along said T-head for frictionally engaging said frame, a retaining rail, said retaining rail joined to said frame and spaced therefrom, a rear axle, said rear axle joined to said frame, a pair of wheels, said pair of wheels attached to said rear axle, a differential, said differential affixed to said rear axle between said pair of wheels, an axle sprocket, an electric motor, said electric motor connected to said axle sprocket, a power source, said power source connected to said electric motor, a controller, said controller connected to said power source and to said electric motor, a pivotable front wheel, said front wheel attached to said frame, a tongue, a tongue sheath, said tongue sheath attached to said frame, said tongue removably mounted in said tongue sheath, a handle, said handle affixed to said tongue, said handle defining the front of said cart, a variable-speed throttle, said throttle connected to said handle for controlling said electric motor, and a bi-directional switch, said bi-directional switch positioned proximate said handle for changing the rotational direction of said axle sprocket, wherein activating said throttle causes said pair of wheels attached to said rear axle to drive said cart in the direction of said front wheel.

2. The utility cart of claim 1 further comprising a rack, said rack comprising a plurality of legs, each of said plurality of legs having a proximal end and a distal end, a rectangular border, each of said plurality of legs affixed at the proximal end to said rectangular border, a plurality of angled supports, each of said plurality of angled supports positioned proximate the proximal ends of different ones of said plurality of legs, said plurality of legs each removably attached to said frame, wherein said angled supports are oriented to receive an article between said plurality of angled supports.

3. The utility cart of claim 1 further comprising a transmission, said electric motor connected to said transmission, a motor sprocket, said motor sprocket joined to said transmission, an endless chain, said endless chain connected to said motor sprocket and to said axle sprocket.

4. The utility cart of claim 1 further comprising a tubular holder, said tubular holder joined to said frame and to said retaining rail.

5. The utility cart of claim 1 wherein said tongue is L-shaped.

6. A utility cart comprising: a frame, a retaining rail, said retaining rail joined to said frame and spaced therefrom, a rear axle, said rear axle joined to said frame, a pair of wheels, said pair of wheels attached to said rear axle, a differential, said differential affixed to said rear axle between said pair of wheels, an axle sprocket, an electric motor, said electric motor connected to said axle sprocket, a power source, said power source connected to said electric motor, a controller, said controller connected to said power source and to said electric motor, a pivotable front wheel, said front wheel attached to said frame, a tongue, a tongue sheath, said tongue sheath attached to said frame, said tongue removably mounted in said tongue sheath, a handle, said handle affixed to said tongue, said handle defining the front of said cart, a variable-speed throttle, said throttle connected to said handle for controlling said electric motor, and a bi-directional switch, said bi-directional switch positioned proximate said handle for changing the rotational direction of said axle sprocket, a rack, said rack comprising a plurality of legs, each of said plurality of legs having a proximal end and a distal end, a rectangular border, each of said plurality of legs affixed at the proximal end to said rectangular border, a plurality of angled supports, each of said plurality of angled supports positioned proximate the proximal ends of different ones of said plurality of legs, said plurality of legs each removably attached to said frame, a plurality of clevises, one each of said plurality of clevises attached at the distal end of different ones of said plurality of legs, wherein said angled supports are oriented to receive an article between said plurality of angled supports, wherein activating said throttle causes said pair of wheels attached to said rear axle to drive said cart in the direction of said front wheel.

7. The utility cart of claim 6 wherein each of said plurality of clevises defines a pin aperture, a plurality of pins, each of said plurality of pins positioned in different ones of said pin apertures.

8. The utility cart of claim 6 further comprising a transmission, said electric motor connected to said transmission, a motor sprocket, said motor sprocket joined to said transmission, an endless chain, said endless chain connected to said motor sprocket and to said axle sprocket.

9. The utility cart of claim 6 further comprising a tubular holder, said tubular holder joined to said frame and to said retaining rail.

10. The utility cart of claim 6 wherein said tongue is L-shaped.

11. A utility cart comprising: a frame, a retaining rail, said retaining rail joined to said frame and spaced therefrom, a rear axle, said rear axle joined to said frame, a pair of wheels, said pair of wheels attached to said rear axle, a differential, said differential affixed to said rear axle between said pair of wheels, an axle sprocket, an electric motor, said electric motor connected to said axle sprocket, a power source, said power source connected to said electric motor, a controller, said controller connected to said power source and to said electric motor, a pivotable front wheel, said front wheel attached to said frame, a tongue, a tongue sheath, said tongue sheath attached to said frame, said tongue removably mounted in said tongue sheath, a handle, said handle affixed to said tongue, said handle defining the front of said cart, a variable-speed rotatable throttle, said rotatable throttle connected to said handle for controlling said electric motor, and a bi-directional switch, said bi-directional switch positioned proximate said handle for changing the rotational direction of said axle sprocket, a sheath aperture defined by said tongue sheath, a pin, a finger ring, said finger ring connected to said pin, said sheath aperture sized to receive said pin, a pair of connectors, said pair of connectors in communication with said rotatable throttle and positioned abutting said tongue sheath, and a pair of U-shaped brackets, said U-shaped brackets affixed to said frame, said U-shaped brackets for attaching said rear axle to said frame, wherein activating said throttle causes said pair of wheels attached to said rear axle to drive said cart in the direction of said front wheel.

12. The utility cart of claim 11 further comprising a rack, said rack comprising a plurality of legs, each of said plurality of legs having a proximal end and a distal end, a rectangular border, each of said plurality of legs affixed at the proximal end to said rectangular border, a plurality of angled supports, each of said plurality of angled supports positioned proximate the proximal ends of different ones of said plurality of legs, said plurality of legs each removably attached to said frame, wherein said angled supports are oriented to receive an article between said plurality of angled supports.

13. The utility cart of claim 12 further comprising a plurality of clevises, one each of said plurality of clevises attached at the distal end of different ones of said plurality of legs.

14. The utility cart of claim 13 wherein each of said plurality of clevises defines a pin aperture, a plurality of pins, each of said plurality of pins positioned in different ones of said pin apertures.

15. The utility cart of claim 11 further comprising a transmission, said electric motor connected to said transmission, a motor sprocket, said motor sprocket joined to said transmission, an endless chain, said endless chain connected to said motor sprocket and to said axle sprocket.

16. The utility cart of claim 11 further comprising a tubular holder, said tubular holder joined to said frame and to said retaining rail.

17. The utility cart of claim 11 wherein said tongue is L-shaped.

18. The utility cart of claim 11 wherein said power source comprises a pair of batteries.

19. The utility cart of claim 11 further comprising an on/off switch, said on/off switch connected to said controller.

\* \* \* \* \*